(12) United States Patent
Munk

(10) Patent No.: US 8,322,124 B2
(45) Date of Patent: Dec. 4, 2012

(54) CENTER SPLITTER RAKE WHEEL STRUCTURE FOR RAKES

(75) Inventor: Jesse T. Munk, Reasnor, IA (US)

(73) Assignee: Forage Innovations B.V., PA Massluis (NL)

( * ) Notice: Subject to any disclaimer, the term of this patent is extended or adjusted under 35 U.S.C. 154(b) by 0 days.

(21) Appl. No.: 13/206,681

(22) Filed: Aug. 10, 2011

(65) Prior Publication Data

US 2012/0036820 A1 Feb. 16, 2012

Related U.S. Application Data

(60) Provisional application No. 61/373,579, filed on Aug. 13, 2010.

(51) Int. Cl.
*A01D 76/00* (2006.01)
*A01D 78/00* (2006.01)
*A01D 80/00* (2006.01)
*A01D 84/00* (2006.01)

(52) U.S. Cl. .......................................................... 56/367
(58) Field of Classification Search ................... 56/367, 56/400, 377, 370, 376, 366; 172/543, 523, 172/556
See application file for complete search history.

(56) References Cited

U.S. PATENT DOCUMENTS

| | | | | |
|---|---|---|---|---|
| 2,588,599 | A | | 3/1952 | Winter |
| 2,811,008 | A | * | 10/1957 | Plant .............................. 56/367 |
| 3,010,526 | A | * | 11/1961 | Van Der Lely et al. ....... 172/543 |
| 3,057,144 | A | * | 10/1962 | Van Der Lely et al. ......... 56/377 |
| 3,069,834 | A | * | 12/1962 | Spindler .......................... 56/377 |
| 3,120,092 | A | * | 2/1964 | Van Der Lely ................. 56/400 |
| 3,127,726 | A | * | 4/1964 | Van Der Lely et al. ......... 56/366 |
| 3,133,399 | A | * | 5/1964 | Van Der Lely et al. ......... 56/372 |
| 3,218,791 | A | * | 11/1965 | Van Der Lely et al. ......... 56/377 |
| 3,320,734 | A | * | 5/1967 | Van der Lely .................. 56/366 |
| 3,447,295 | A | * | 6/1969 | Van Der Lely et al. ......... 56/400 |
| 3,706,191 | A | * | 12/1972 | Barbot ............................ 56/377 |
| 3,771,303 | A | * | 11/1973 | Van der Lely et al. .......... 56/400 |
| 3,827,224 | A | * | 8/1974 | Mulder et al. .................. 56/370 |
| 3,841,073 | A | * | 10/1974 | Van Der Lely ................. 56/370 |
| 3,946,544 | A | * | 3/1976 | van der Lely ................... 56/370 |
| 4,148,176 | A | * | 4/1979 | van der Lely et al. .......... 56/370 |
| 4,324,093 | A | * | 4/1982 | van der Lely et al. .......... 56/377 |
| 4,330,986 | A | * | 5/1982 | van der Lely et al. .......... 56/377 |
| 4,516,393 | A | * | 5/1985 | Lambert ..................... 56/400.2 |
| 4,583,307 | A | | 4/1986 | Lenert |
| 4,699,275 | A | * | 10/1987 | Holsonbake .................. 209/616 |
| 5,479,768 | A | * | 1/1996 | Hettich ........................... 56/365 |
| 5,546,739 | A | * | 8/1996 | Hettich ........................... 56/367 |
| 5,956,934 | A | * | 9/1999 | Wright et al. ................... 56/377 |
| 5,960,620 | A | * | 10/1999 | Wright et al. ................... 56/377 |

* cited by examiner

*Primary Examiner* — Arpad Fabian-Kovacs
(74) *Attorney, Agent, or Firm* — Sturm & Fix LLP

(57) ABSTRACT

A pair of rake wheels in an assembly is referred to as a center splitter assembly. Each rake wheel is configured for free-rotation, meaning it is powered by contacting the ground. The center splitter is used to separate material, each wheel moving material in a different direction. The rake wheel on the left side of the center splitter assembly will rotate in a clockwise direction, as viewed from behind the wheel, which will cause the material to move from the right to the left. The opposite applies to the rake wheel on the right side of the center splitter assembly, where it will rotate counter-clockwise, moving material from the left to the right. Since these rake wheels are attempting to move material in opposite directions, the spacing between the wheels has been found to be critical.

8 Claims, 12 Drawing Sheets

CENTER SPLITTER RAKE WHEEL STRUCTURE FOR RAKES

CROSS REFERENCE TO RELATED APPLICATIONS

This application claims the benefit of U.S. Provisional Application Ser. No. 61/373,579 filed Aug. 13, 2010 entitled "Center Splitter for Rake" which is incorporated by reference herein in its entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

Field of the Invention

Various types of rakes are known to include a left side raking device, that moves material from the left to the middle, and a right side raking device, that moves material from the right to the middle, to form a windrow in the middle of the machine. These rakes are often referred to as V-Rakes, due to the configuration that has the shape of the letter "V", when in the operating position. The windrows typically range from 2½ feet wide to 5 feet wide, typically being formed under the main frame of the raking device. The material lying on the ground in the location of the forming windrow is not turned or moved by either the left or right raking devices. It is advantageous to move that material, thus there is a need for a device to operate in the vicinity, typically under, the main frame of the rake, to move material off the ground in the location where the final windrow will be formed.

Examples of such devices in a variety of configuration can be found. However, there is a need for an improved device that provides more reliable operation, and that is cost effective to manufacture, and that fits conveniently onto the typical structure of the rake.

One type of rake, known as a wheel rake, commonly includes a set of generally planar rake wheels, each including a set of tines. Each rake wheel is oriented generally perpendicular to the ground. Some of the tines of each wheel contact the ground such that movement of the rake subsequently causes the wheel, along with all its tines, to rotate. The tines that are in contact with the crop material will subsequently lift and move the crop material along the ground.

Wheel rakes configured as V-rakes have a set of left rake wheels and a set of right rake wheels. Forward movement of the rake will cause the wheels to rotate. When viewed from behind each wheel, the wheels on the left side will rotate counter-clockwise, which will cause the material, typically hay or straw, to be moved from left to right. The wheels on the right will rotate clockwise, and the material, typically hay or straw, will be moved from right to left.

Ground driven rake wheels are known to be configured in non-planar configurations, one example being described in U.S. Pat. No. 2,588,599 wherein a single wheel is used to move material. This general configuration has also been described for other applications as described in U.S. Pat. No. 4,583,307 wherein a set of wheels is configured to move material in one direction.

BRIEF SUMMARY OF THE INVENTION

The current invention utilizes a pair of rake wheels in an assembly that will be referred to as a center splitter assembly. Each rake wheel is configured for free-rotation, i.e., to be powered by contacting the ground as described above, but with a modified tine profile, and modified orientation. The center splitter is used to separate material, each wheel moving material in a different direction. The rake wheel on the left side of the center splitter assembly will rotate in a clockwise direction, as viewed from behind the wheel, which will cause the material to move from the right to the left. The opposite applies to the rake wheel on the right side of the center splitter assembly, where it will rotate counter-clockwise, moving material from the left to the right. Since these rake wheels are attempting to move material in opposite directions, the spacing between the wheels has been found to be critical.

The center splitter assembly is located in a position on the machine where space is limited. The present invention provides a solution that fits in the available space, allows the rake to fold to a transport orientation, while providing adequate performance by positioning each rake wheel with an effective raking distance that extends from the approximate center of the mount frame, to a distance away from the center.

In addition to drying material, lifting and turning the crop at that location can increase the efficiency of the baler/harvester to pick up the crop from the stubble. The splitter lifts the hay off the ground allowing the pickup on the baler to clean the ground better. This allows the baler operator to increase efficiency (drive faster, less crop loss). For the same reason, the splitter is also beneficial for crops that have been rained on causing them to lay closer/flatter to the ground.

Spacing the wheels apart by a minimum distance as specified in the attached claims allows the splitter to part longer crops which is typical of most hay conditions. The first prototypes tested in the field by the inventor had the rake wheels too close together. This caused the same pieces of crop to engage both wheels. This, in turn, caused the wheels to fight each other and eventually stop rotating because the wheels pull in opposite directions.

The mounting arrangement of the rake wheels in the center splitter assembly has also been found to be critical to proper function. Each rake wheel is independently mounted on a trailing arm support, with a common lift device. The preferred embodiment of the lift device is a hydraulic cylinder that will lift and lower both rake wheels simultaneously. Once lowered, each rake wheel can rise independently to follow the contour of the ground, or to raise to travel over top of other obstructions.

The mounting of the rake wheel is important to good rake wheel life. The rake wheel "trails" behind the pivot point and slots on the mount allow the rake wheel to follow the ground and rise over bumps. This configuration also removes the need for suspension that is typical of wheel rakes. This mounting reduces ground pressure as the rake passes over the field. The latest test stand results show the splitter tines of the instant invention out live standard tines by over three times.

A major advantage of the mounting arrangement of the rake wheels on the center splitter of the present invention is that there is no need for suspension to obtain increased rake tine life. The center splitter rake wheels assembly of the present invention follows contour of ground, and when plugging starts to occur the wheels tend to lift, which prevents damage to the components.

The preferred embodiment has the center splitter lift cylinder connected in series with the lift system for the main rake arms, so that lifting and lowering can be accomplished with a single hydraulic circuit.

DETAILED DESCRIPTION OF THE INVENTION

By changing the tine profile of a full sized rake wheel, and repositioning its orientation, this known configuration of a raking device can function in a constricted area, such as under the frame or under the tongue of the machine. The advantage of using a full sized wheel (for example, about 56 inch diameter) is to reduce crop wrapping under certain conditions when compared to a smaller diameter rake wheel.

The rake wheel is positioned at a compound angle which allows the tines to reach previously inaccessible areas, such as under tongues or frames. The tines of the rake wheel are bent to form an angle approximately perpendicular to the ground. This creates a dish shaped rake wheel. The result of tine profile allows the tines to drive the wheel and facilitate hay movement in constricted areas. A standard rake wheel in this position would cause the tines to passes over the crop without lifting and moving the crop. This present design is useful, when used as a pair, as a center windrow splitter for rakes where there is a necessity to reach under the frame to move crop.

Figure 1:
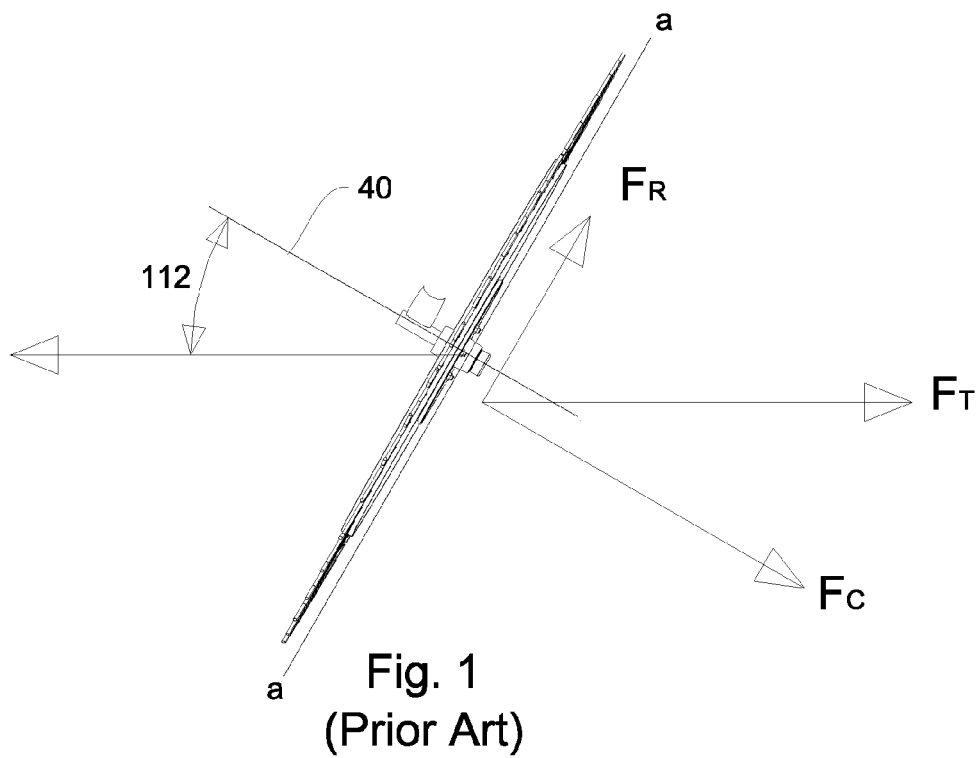
FIG. 1 is a top view of a prior art rake wheel moving to the left and showing the forces imposed on the rake wheel.
Figure 2:
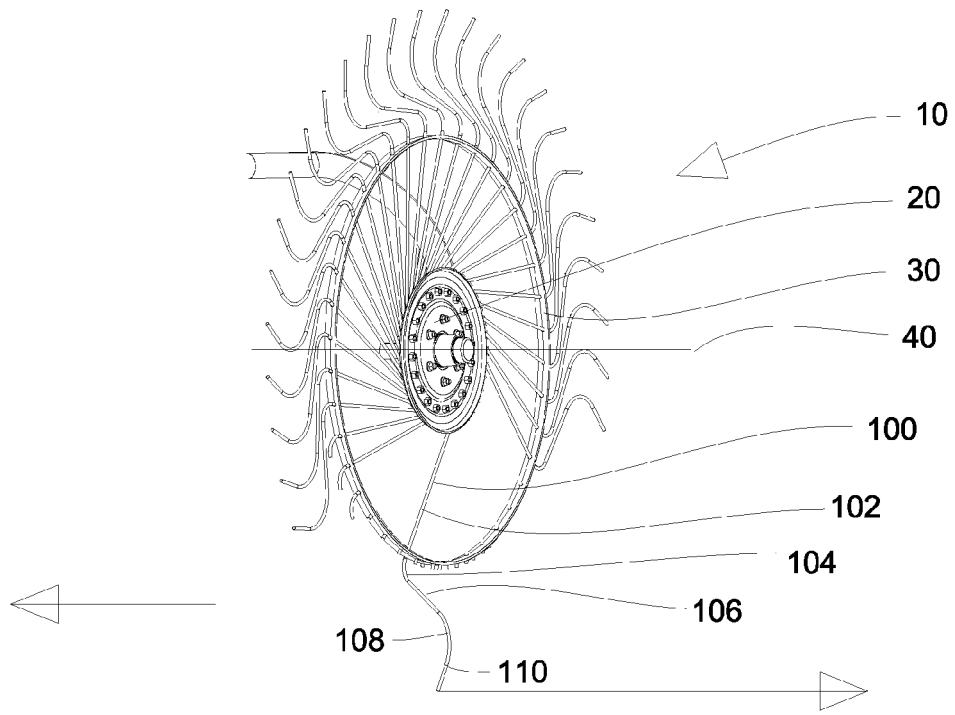
FIG. 2 is a side view looking in a direction perpendicular to the direction of movement of the rake wheel, with emphasis on one of the tines shown at the bottom of FIG. 2.

FIGS. 1 and 2 illustrate prior art rake wheels 10 that comprise a number of tines 100 that attach at a first end to a center hub 20, pass through a rim 30 and terminate at the second end at a straight section that functions to contact and move crop material. The tines are generally located within a plane a-a, and include a center section 102, a bent second section 104, a straight lever-arm third section 106, a bent forth section 108 and a straight raking section 110. Each tine contacts the ground and or crop material as it rotates about the axis of rotation 40 of the wheel. FIG. 2 shows a single tine at a lower position where the second end of that tine end is at the lowest position, where it will be in contact with the ground. The wheels are mounted on a frame that moves the rake wheel in a direction of travel to the left as illustrated in FIG. 1, such that the axis of rotation of the wheel is rotated from the direction of travel an angle 112, more than 30 degrees. The movement of the wheel combined with the tine contact with the ground results in the generation of a tine force $F_T$. The angled relationship of the wheel assembly to the direction of travel results in the force $F_T$ having two components, a rotation force $F_R$ and a crop force $F_C$ as illustrated in FIG. 1. The rotation force $F_R$ tends to cause the wheel to rotate about its axis of rotation 40, while the crop force acts on and moves the crop material. It has been found that the angle 112 needs to be more than 30 degrees. If an angle of less than 30 degrees is utilized the wheel does not rotate adequately because the rotation force $F_R$ will be proportionally lower.

Still referring to FIGS. 1 and 2, this assembly works well for raking hay, and provides a reliable and cost effective construction. The effectiveness of the tine is a result of the load bearing characteristics of the tine. As noted above the end 110 will contact the ground and or the crop. The resultant force is transferred through the bent section 108 to the straight section 106 that acts like a lever arm, transferring the loading to the bent section 104 which is in contact with the rim. The resulting load conditions include bending load of the tine at the rim, but also a significant amount of torsional loading of the straight section 102, that functions as a spring, to absorb much of the force.

Figure 7:
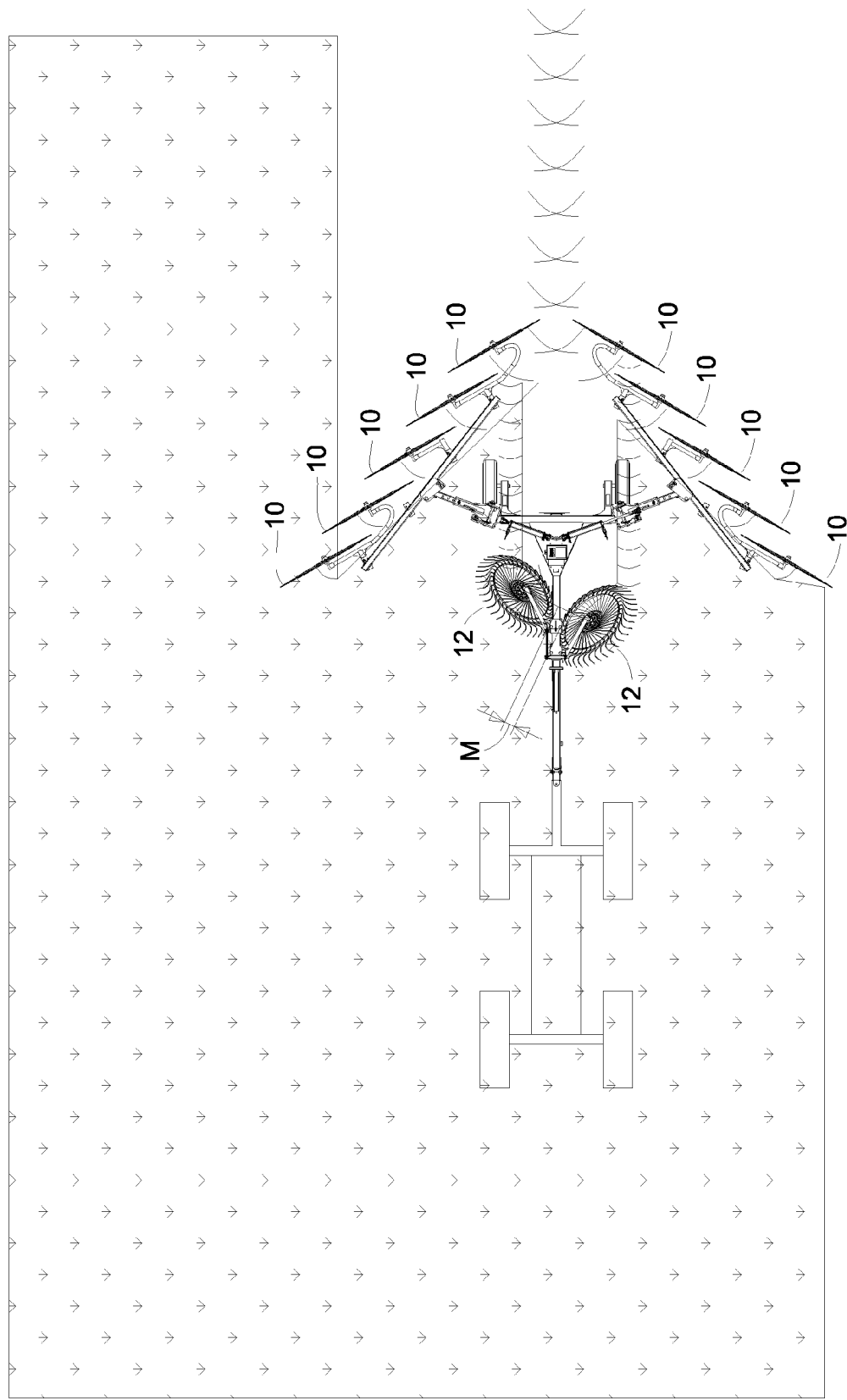
FIG. 7 is a top view showing two rake wheels of the current invention are placed in the center, in a center splitter assembly, each working to move material in an opposite direction, to spread the material that would otherwise have not been moved.
Figure 11:
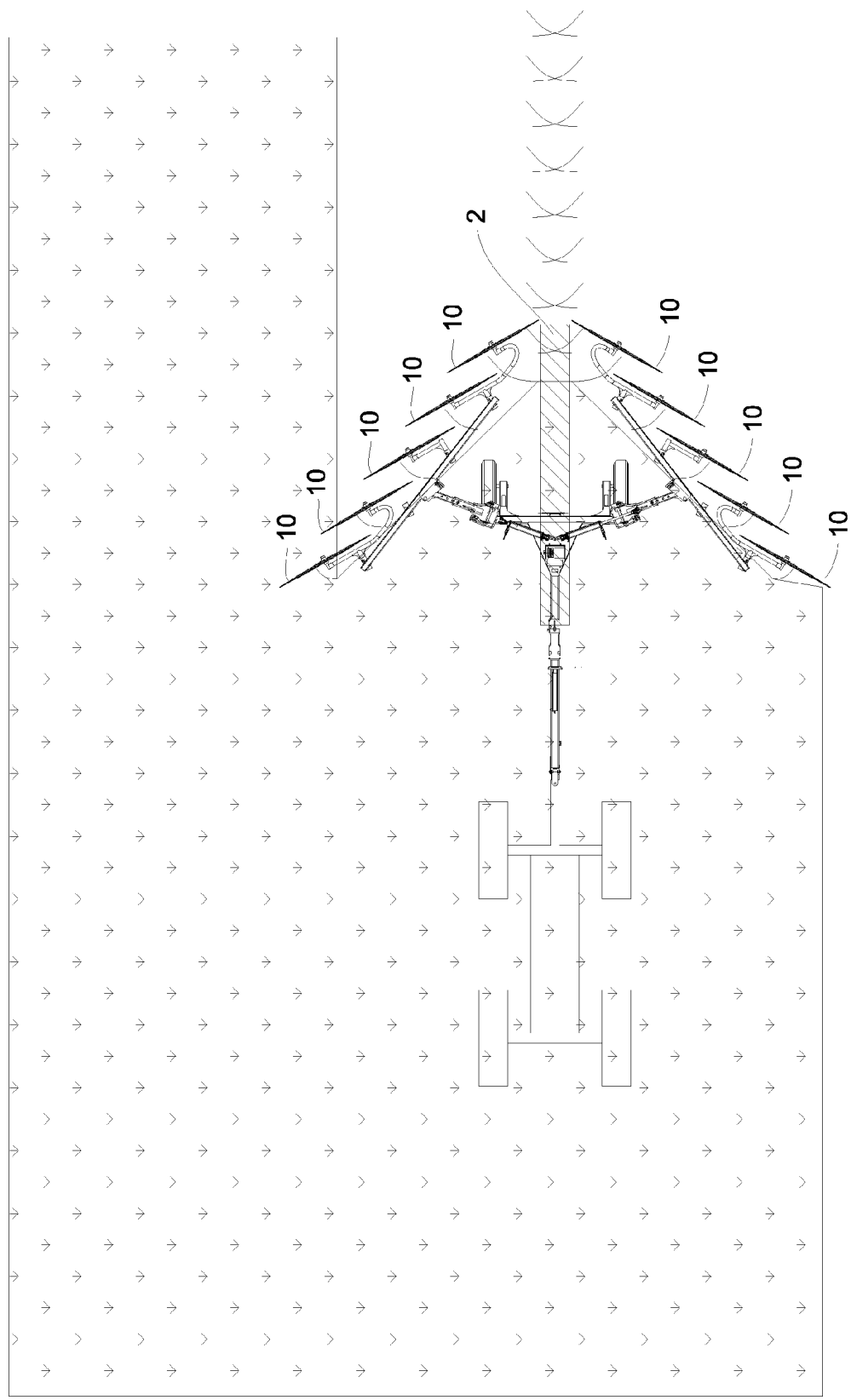
FIG. 11 shows a rake of a configuration where the crop material centered on the location of the windrow being formed is left on the ground, undisturbed.

The current invention builds on the success of the prior art wheel, while also providing unique features. There is a need for a device to move crop material from the center location of a towed rake, as illustrated in FIG. 11. In a rake of this configuration the crop material centered on the location of the windrow being formed, illustrated as area 2, is left on the ground, undisturbed. This is undesirable since that material will not dry as well as the material that has been raked, due to the fact that it is left on the ground and in closer contact with the ground than the raked material, and the fact that the raked material is placed on top. In addition, the material that is left on the ground is more difficult for a machine to pick-up during the harvest process. The rake wheels and rake of the current invention solve this problem. As illustrated in FIG. 7, two rake wheels 12 of the current invention are placed in the center, in a center splitter assembly, each working to move material in an opposite direction, to spread the material that would otherwise have not been moved. The resulting windrows, wherein all the material has been lifted off the ground and fluffed-up, will dry quicker and optimize the performance of the subsequent harvest operation, typically either a baler or a forage chopper.

Figure 3:
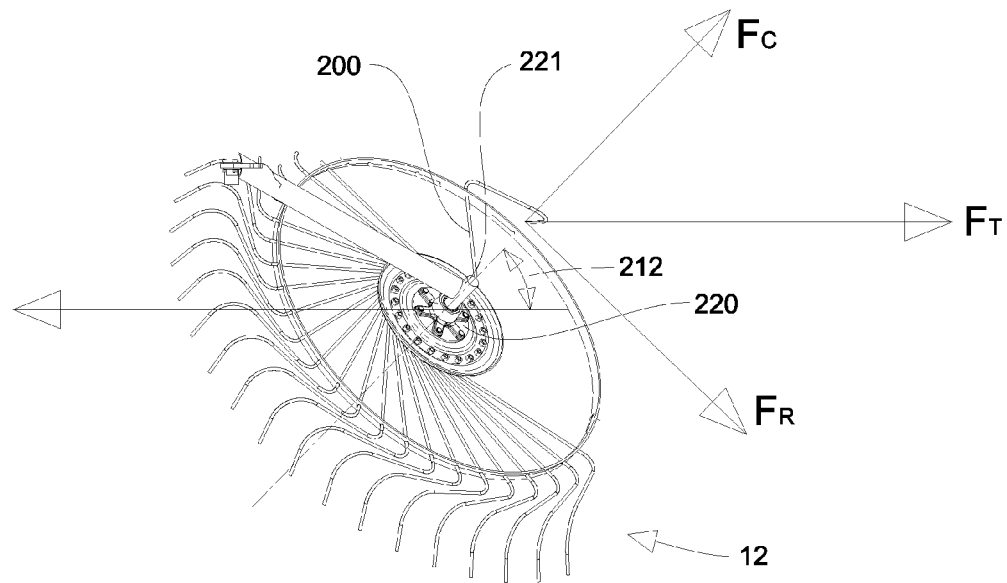
FIG. 3 shows a number of tines that attach at a first end to a center hub, pass through a rim and terminate at the second end at a straight section that functions to contact and move crop material.
Figure 4:
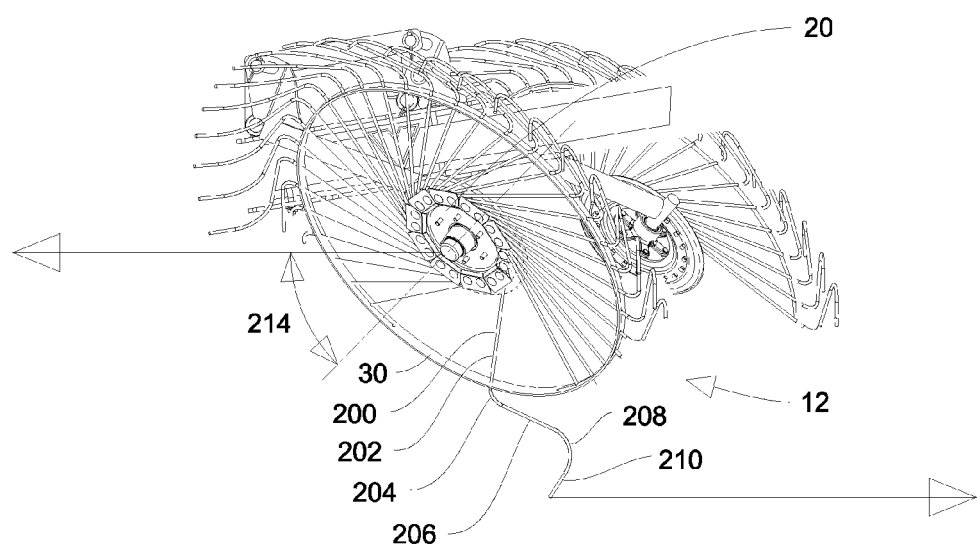
FIG. 4 also shows a number of tines that attach at a first end to a center hub, pass through a rim and terminate at the second end at a straight section that functions to contact and move crop material.
Figure 5:
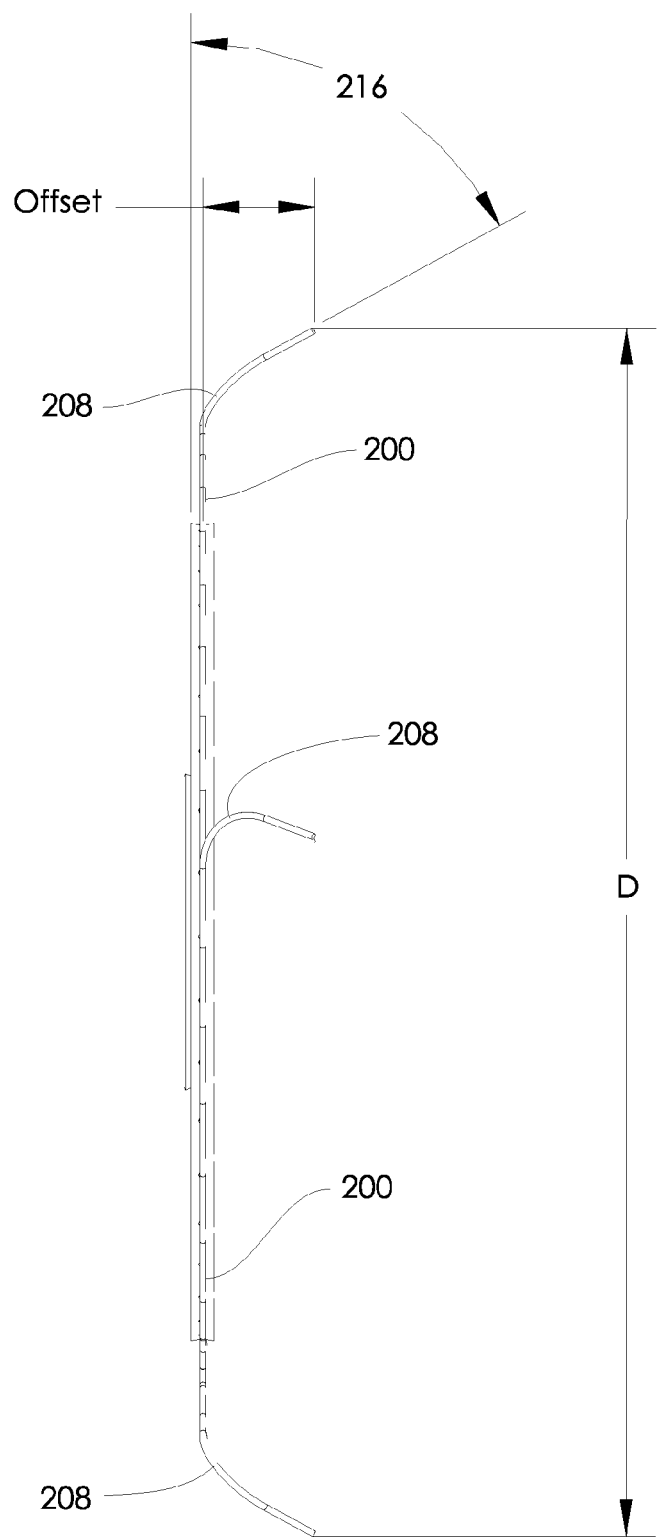
FIG. 5 is a top view of only three of the many tines in the wheel rake of the present invention.
Figure 6:
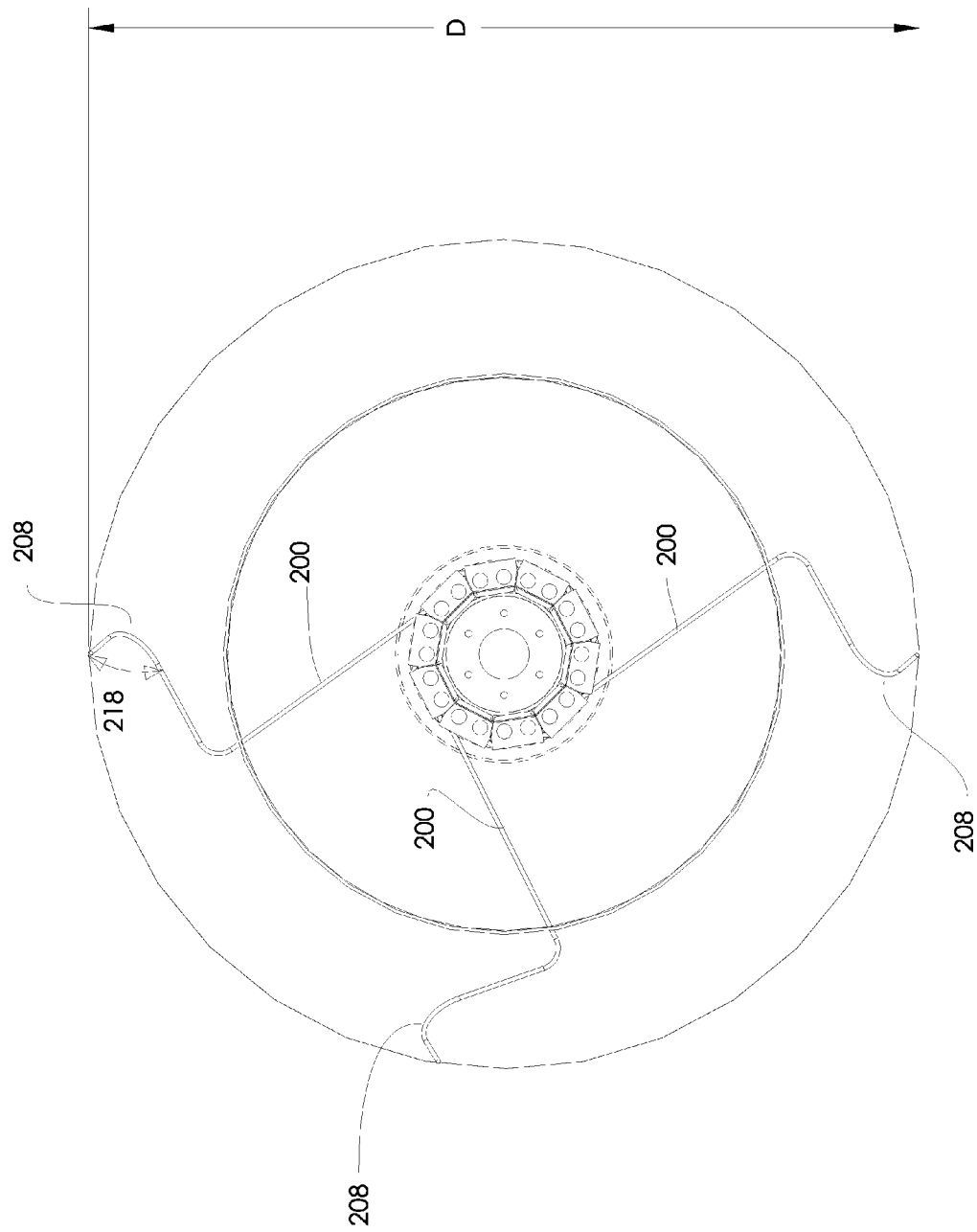
FIG. 6 is a side view that shows the configuration of only three of the many tines in the wheel rake of the present invention.

The new rake wheel 12 illustrated in FIGS. 3 and 4, comprises a number of tines 200 that attach at a first end to a center hub 20, pass through a rim 30 and terminate at the second end at a straight section 210 that functions to contact and move crop material. The tines are similar to the tines of the prior art in that there is a center section 202 that acts like a torsional spring, a first bent section 204 located on adjacent the rim, a straight section 206 that acts like a lever arm. The rake tine of the present invention deviates from the prior art in the orientation of bend 208, which includes a portion of the bend within the same plane as the first bent section, but also a portion of the bend in a different plane. This is illustrated in FIGS. 5 and 6 which illustrates three tines 200 in a wheel. FIG. 5 is a side view showing the bend 208 that results in the tine section 210 being located at an angle 216, in a preferred embodiment 61 degree, deviation from the plane that contains the rest of the tine. This angle 216, from the vertical plane in this figure, can be within a range from 30 to 70 degrees. The bend 208 is a compound bend, in that it also reorients the tine section 210 an angle 218 of approximately 90 degrees as shown in FIG. 6.

With the tines formed as described above, the rake wheel 12 is oriented with its axis of rotation as shown in FIGS. 3 and 4, at a compound angle. As viewed from above in FIG. 3 the axis of rotation is positioned an angle 212 from the direction of travel. This angle is similar to that used for the prior art wheels. The angle will be dependent on the tine profile, the preferred embodiment in this figure illustrates a configuration of approximately 30 degrees, where this angle can be varied between 20-40 degrees.

As viewed from the side in FIG. 4 the axis of rotation is positioned an angle 214 from the direction of travel, or relative to the ground. This is preferably set to orient the tine section 210 approximately perpendicular to the ground. Thus, there is a correlation between the angle 216 and the preferred angle 214. If angles 214 and 216 are approximately equal, the tine section 210 will be approximately perpendicular to the ground.

FIG. 7 is a view of a complete rake with the center splitter including two rake wheels 12 positioned ahead of the prior art wheels on a frame where the rake wheels 12 will move the material away from the center. The rake wheels 12 of the center splitter are between 50 inches and 60 inches in diameter and are spaced apart so that they are at least 6 inches apart at the closest point, labeled as dimension M. The material moved by the center splitter is subsequently moved, by the prior art rake wheels 12, back towards the center to form a windrow, where all the material in the windrow has been lifted off of the ground for improved drying.

Figure 8:
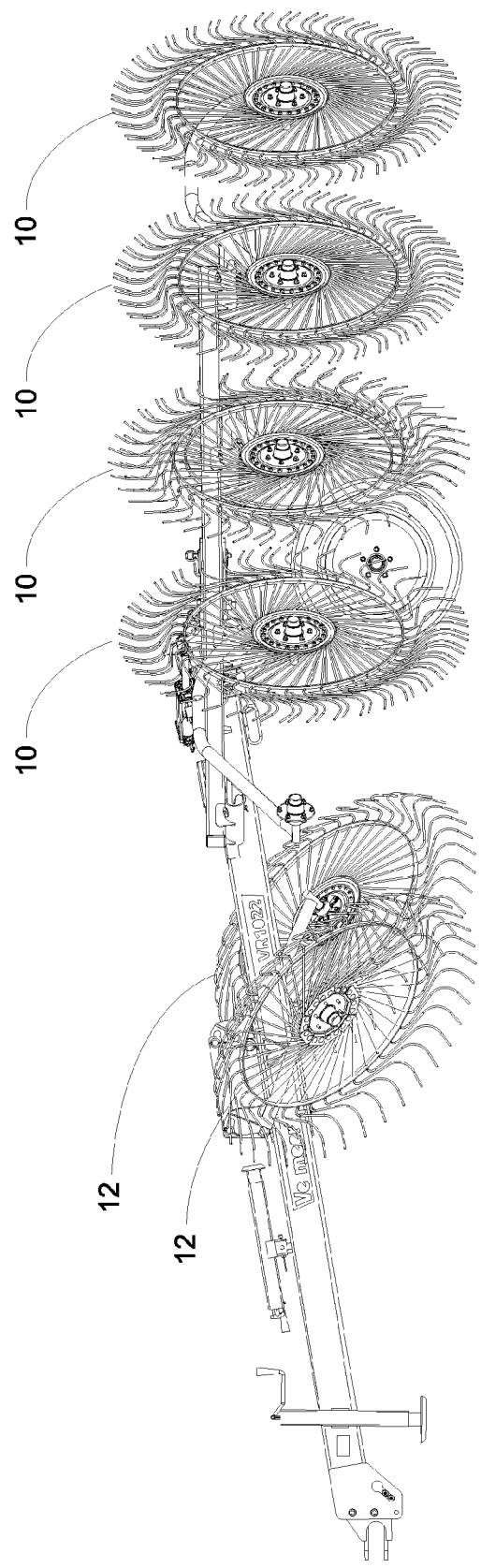
FIG. 8 is a side view illustrating the positioning of the new rake wheels in relation to prior art rake wheels.
Figure 9:
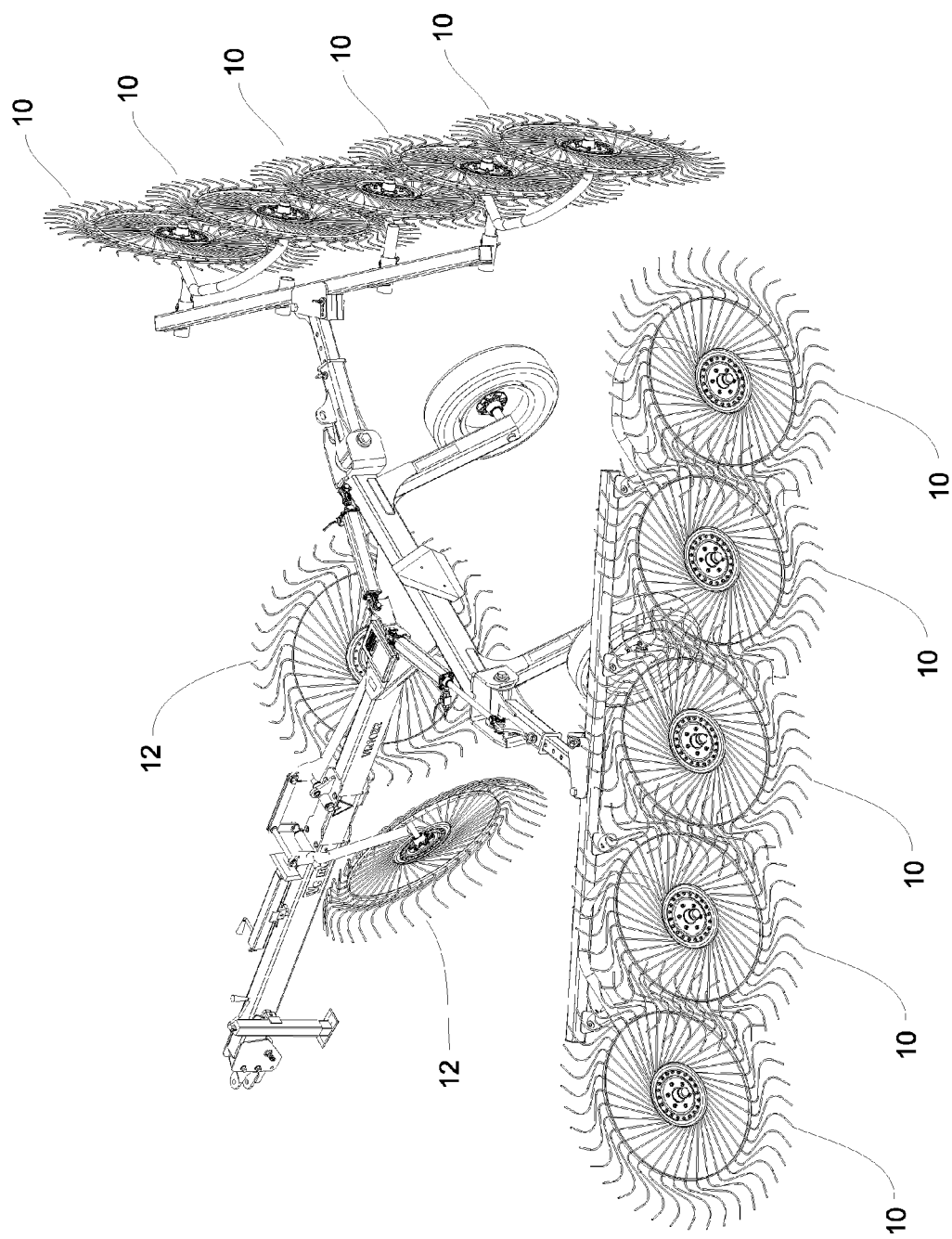
FIG. 9 is an isometric view illustrating the positioning of the new rake wheels in relation to prior art rake wheels.
Figure 10:
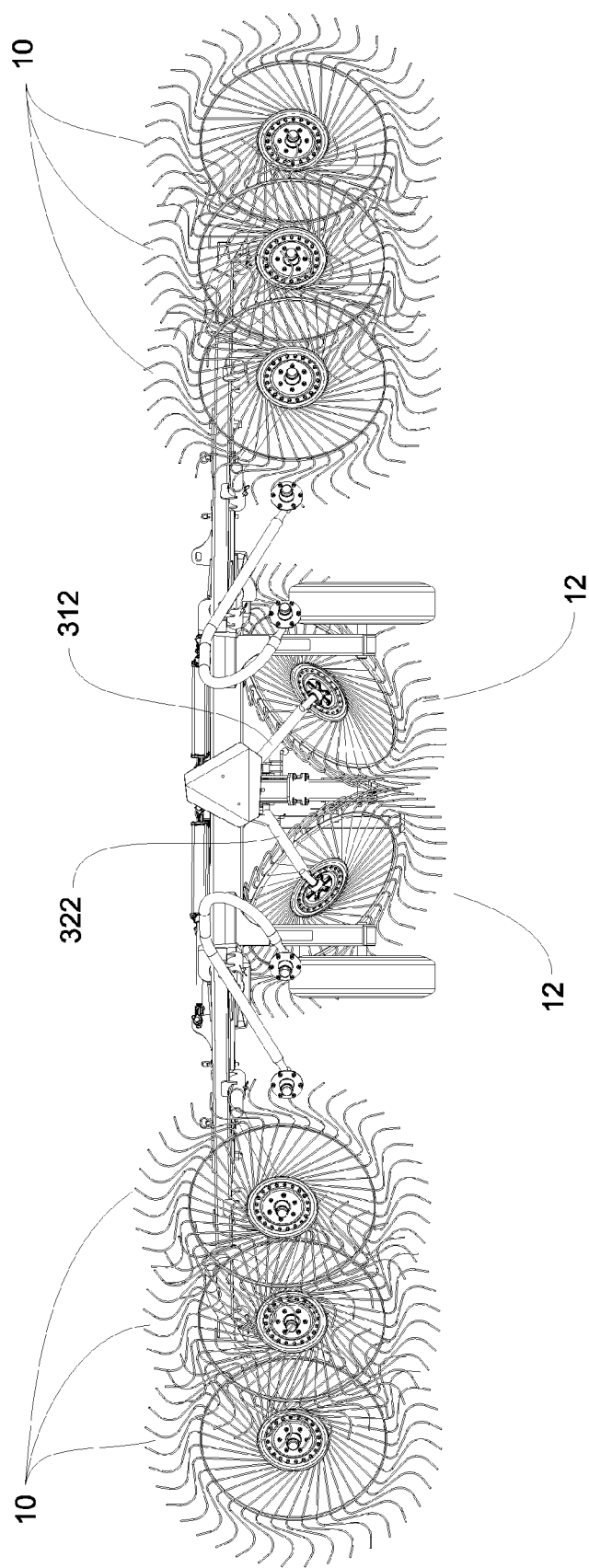
FIG. 10 is a front view that illustrates an advantage of the new rake wheels.

FIG. 8 is a side view illustrating the positioning of the new rake wheels 12 in relation to prior art rake wheels 10. FIG. 9 is an isometric view illustrating the positioning of the new rake wheels 12 in relation to prior art rake wheels 10. FIG. 10 is a front view that illustrates an advantage of the new rake wheels 12. Due to the fact that these wheels 12 are rotated as previously described they are capable of effectively reaching under the frame of the rake to move the material in the center off of the ground. This configuration also allows the rake wheels to be lifted out of the way in a transport position.

Figure 12:
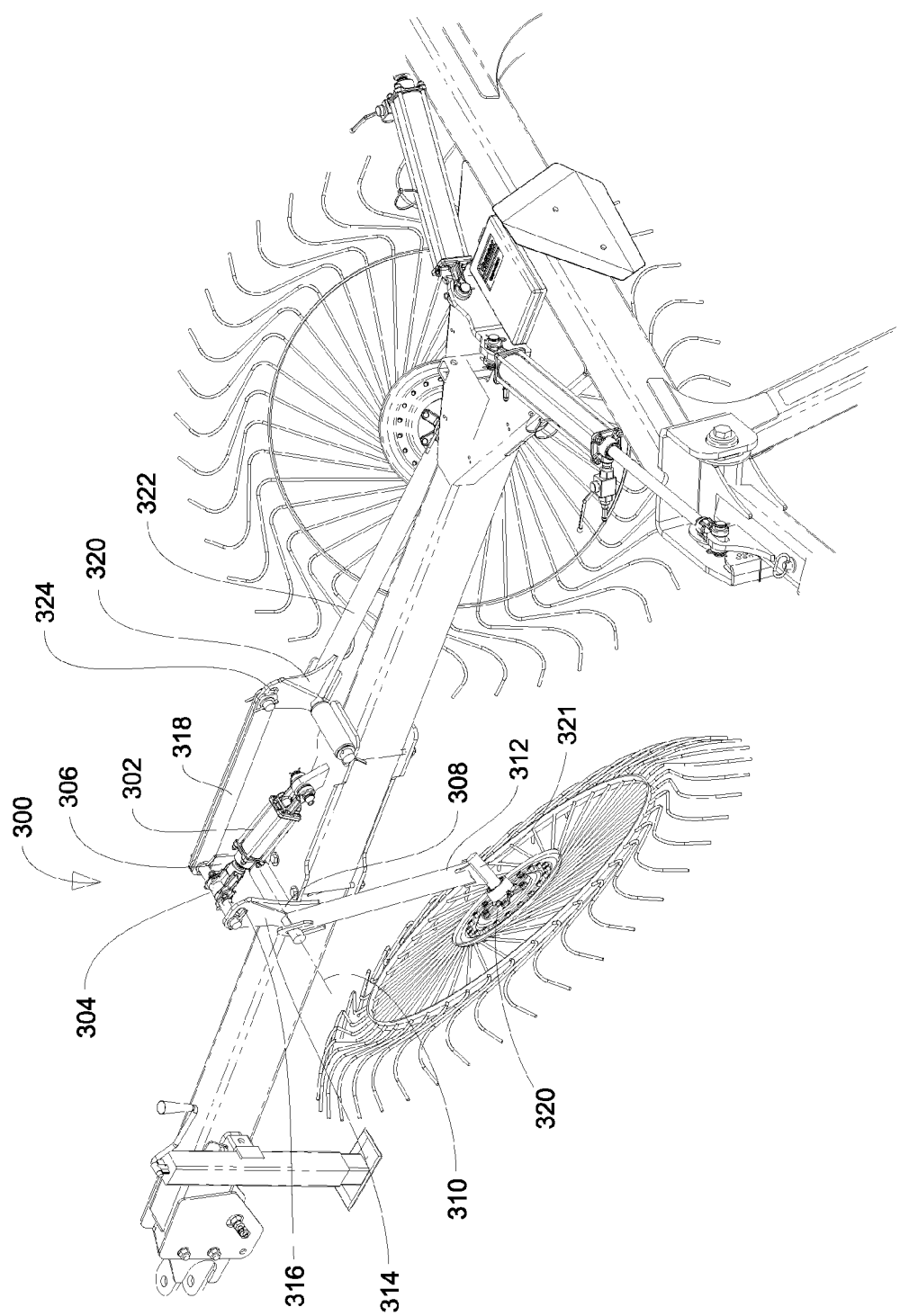
FIG. 12 illustrates a lifting mechanism for the center splitter including a cylinder that moves a lifting pin as it extends and retracts.

FIG. 12 illustrates the lifting mechanism 300 for the center splitter including a cylinder 302 that moves a lifting pin 304 as it extends and retracts. Lifting pin 304 is attached to the main frame by plates 306 and 308 that are free to rotate about an axis of rotation 310 as the cylinder 302 moves the linkage of FIG. 12. The left side support 312 for the left rake wheel of the center splitter is pivotally mounted to freely rotate about axis 310. The left side support 312 includes a torque arm 314 with a slot 316 aligned with lift pin 304. The slot is configured to allow the left rake wheel to lift freely from a lowered position.

Lift bar 318 is connected on one end to lift pin 304, and on the opposite end to torque arm 320. The torque arm 320 is part of the right side support 322 for the right rake wheel of the center splitter. Torque arm 320 includes a slot 324 that allows the right rake wheel to lift freely from a lowered position shown in FIG. 12.

Figure 13:
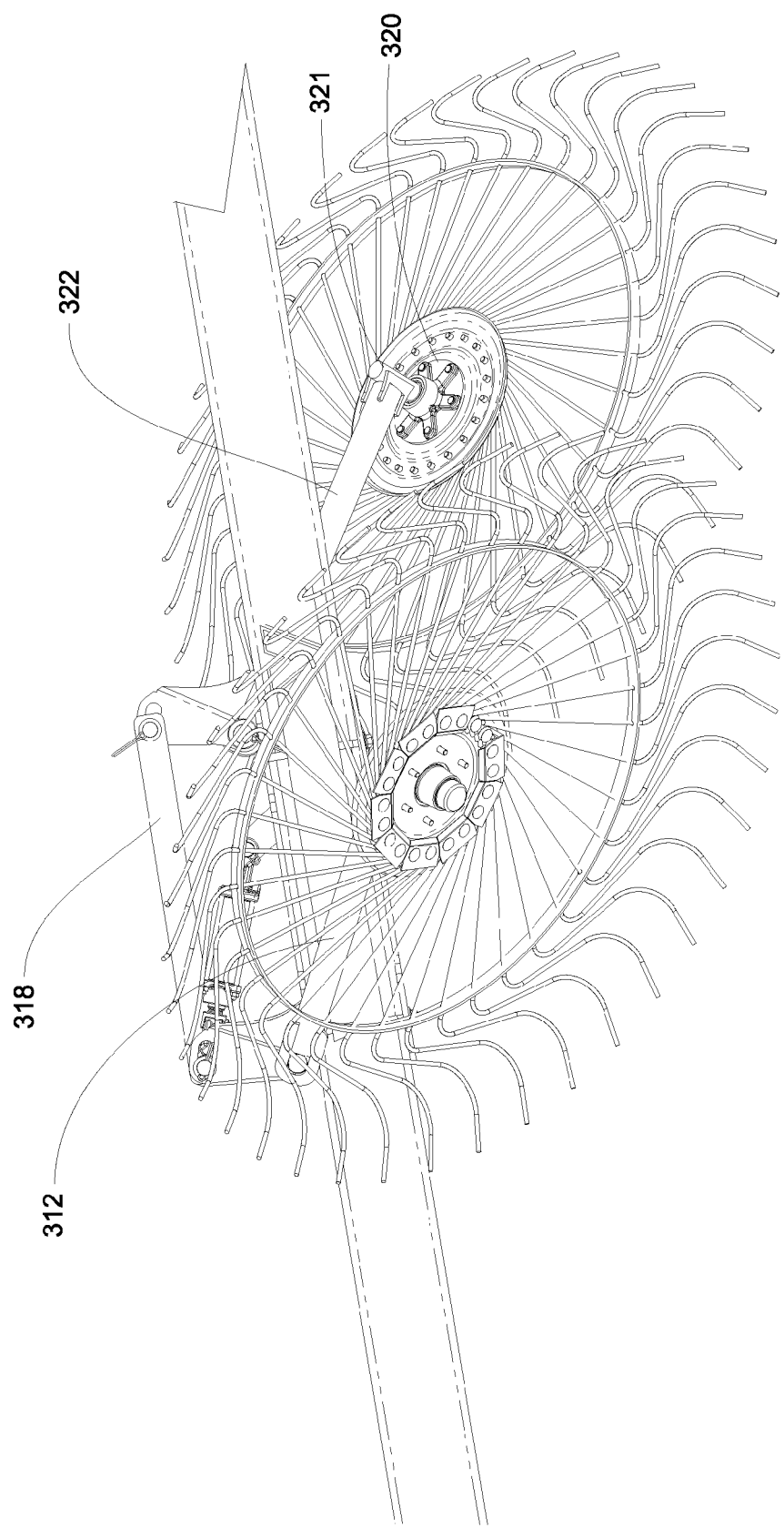
FIG. 13 shows the orientation of the lift arms, which are substantially horizontal, angled slightly up so that the lift arms pull the rake wheels.

FIG. 13 illustrates the orientation of the lift arms 312 and 322, which are substantially horizontal, angled slightly up so that the lift arms pull the rake wheels.

Figure 14:
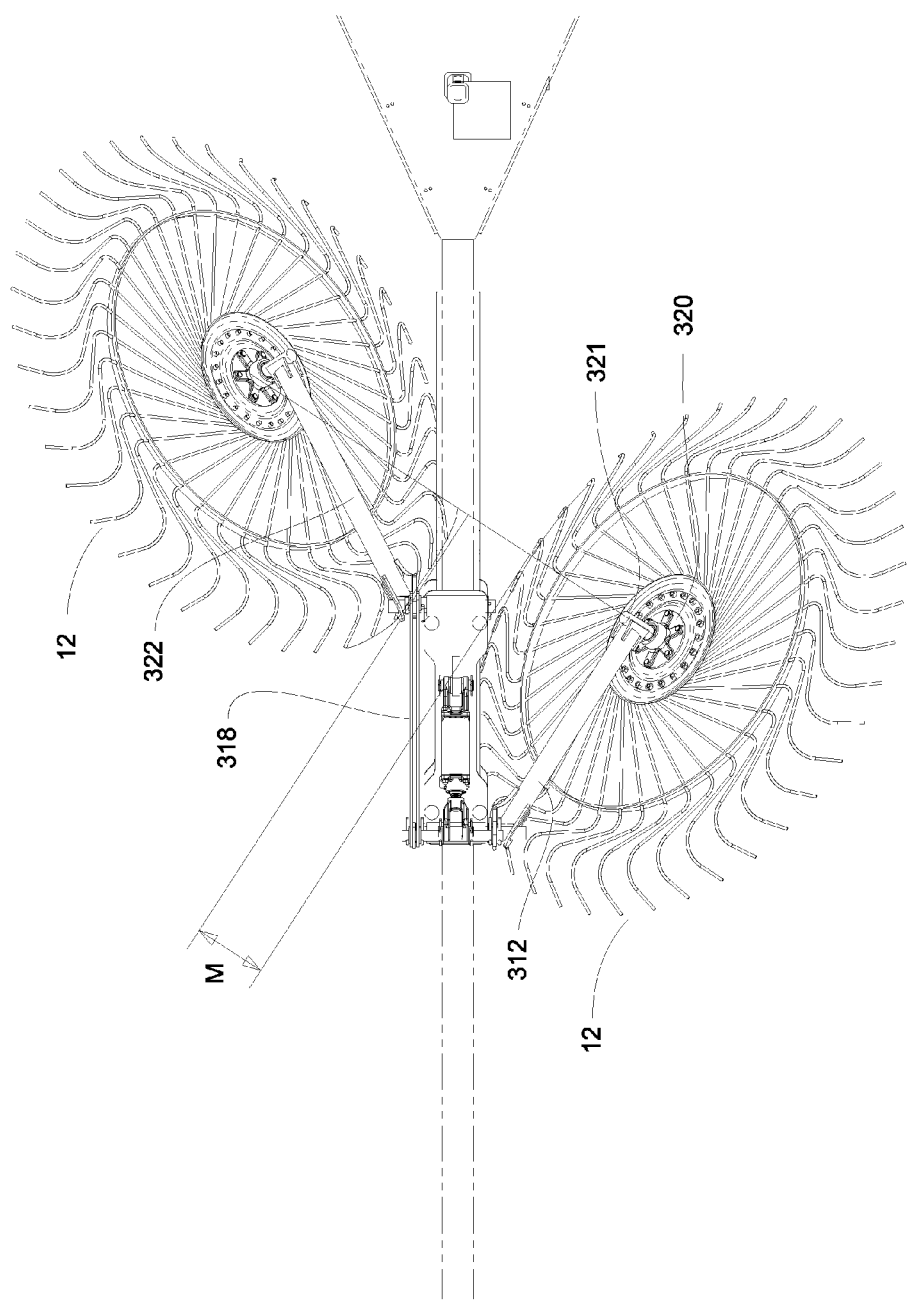
FIG. 14 is a top view of the center splitter assembly.

FIG. 14 is a top view of the center splitter assembly 300 with wheels that are between 50 inches and 60 inches in diameter, and spaced apart so that they are at least 6 inches apart at the closest point, labeled as dimension M, wherein the tip diameter D of the rake wheels is at least six (6) times the minimum distance M between the outer tip diameter of the rake wheels. FIGS. 3, 12, 13 and 14 show a hub 220/320 mounted to a spindle 221/321 for rotation about an axis of rotation with a tine mount surface.

Increased tine life is an additional benefit to the orientation and profile of the rake tine on the center splitter wheel. The design and orientation of the tine greatly increases tine life. Standard rake wheel tines are seen to fail at a predictable number of hours whereas testing for over two weeks did not result in even one failed tine from the splitter rake wheel of the present invention. This is believed to be due to the fact that on a standard rake wheel the flexing of the tines occur at specific places on the tine, whereas the bending forces for the splitter rake wheel 12 are distributed more evenly throughout the length of each tine, resulting in longer life of the tines compared to standard tines.

Accordingly, it will be appreciated that the preferred embodiments herein do indeed accomplish the aforementioned objects. Obviously many modifications and variations of the present invention are possible in light of the above teachings. It is therefore to be understood that, within the scope of the appended claims, the invention may be practiced otherwise than as specifically described.

The invention claimed is:

1. An apparatus for raking crop materials comprising:
  a. a frame;
  b. a rake wheel operatively attached to the frame comprising:
    i. a hub mounted to a spindle for rotation about an axis of rotation with a tine mount surface;
    ii. a rim;
    iii. rake tines attached to the rim that terminate with a generally straight section rotated from 20 to 70 degrees from a plane oriented perpendicular to the axis of rotation;
  c. the rake wheel being disposed with the axis of rotation at a first angle, projected on a horizontal plane, of between forty-five and seventy-five degrees measured from a plane oriented perpendicular to a direction of travel, and at a second angle, projected on a vertical plane, of between 20 and 70 degrees relative to the horizontal plane.

2. The apparatus of claim 1 wherein terminal ends of all the rake tines lie on a same side of rake wheel.

3. An apparatus for raking crop material including a dished rake wheel comprising:
  a. a hub mounted to a spindle for rotation about an axis of rotation with a tine mount surface;
  b. a rim with a plurality of apertures disposed therein;
  c. rake tines each comprising:
    i. a first section, with an inner end attached to the tine mount surface, extending from the tine mount surface and passing through a respective one of the apertures in the rim to an outer end thereof;
ii. a second section attached at an inner end to the outer end of the first section, the second section being located radially outwardly from the rim and being bent with respect to the first section;
iii. a third section that is generally straight and positioned generally tangential to the cylindrical rim, the third section being attached to and being disposed radially outwardly from the second section;
iv. a fourth section that is bent, the fourth section being attached to and being disposed radially outwardly from the third section;
v. a fifth section that is generally straight and disposed between 20 and 70 degrees relative to a plane oriented perpendicular to the axis of rotation and being attached to and being disposed radially outwardly from the fourth section.

4. The apparatus of claim 3 further comprising a frame that positions the dished rake wheel with the axis of rotation at an angle, as projected on a horizontal plane, of between forty-five and seventy-five degrees relative to a plane oriented perpendicular to the direction of travel and at a second angle, as projected on a vertical plane, of between 20 and 70 degrees relative to the horizontal plane.

5. The apparatus of claim 4 wherein the dished rake wheel is positioned in the center and located to move crop material towards the outside of the apparatus.

6. The apparatus of claim 5 further comprising a series of rake wheels positioned to follow the dished rake wheel to move the crop material back towards the center to form a windrow of material wherein all the material has been moved.

7. A center windrow splitter comprising:
a. a pair of rake wheels, each wheel comprising
   i. a hub mounted to a spindle for rotation about an axis of rotation with a tine mount surface;
   ii. a rim;
   iii. rake tines attached to the rim that terminate with a generally straight section rotated from 20 to 70 degrees relative to a plane oriented perpendicular to the axis of rotation wherein a tip diameter of each rake wheel is between 50 and 60 inches;
b. a frame that positions each rake wheel with the axis of rotation at a first angle, projected on a horizontal plane, of between forty-five and seventy-five degrees relative to a plane oriented perpendicular to the direction of travel and at a second angle, projected on a vertical plane, of 20 to 70 degrees relative to the horizontal plane;
c. wherein the rake wheels are positioned such that there is a minimum distance of 6 inches between outer tip peripheries of the rake wheels.

8. A center windrow splitter comprising:
a. a frame;
b. a pair of rake wheels, each wheel comprising
   i. a hub mounted to a spindle for rotation about an axis of rotation with a tine mount surface;
   ii. a rim;
   iii. rake tines attached to the rim that terminate with a generally straight section rotated from 20 to 70 degrees from a plane oriented perpendicular to the axis of rotation;
   iv. wherein a tip diameter of each rake wheel is between 50 and 60 inches;
c. each rake wheel being operatively attached to the frame and disposed with the axis of rotation at a first angle, as projected on a horizontal plane, of between forty-five and seventy-five degrees relative to a plane oriented perpendicular to the direction of travel and at a second angle, as projected on a vertical plane, of 20 to 70 degrees relative to the horizontal plane;
d. wherein the rake wheels are positioned such that there is a minimum distance between the outer tip diameter of the rake wheels;
e. wherein the rake wheels are positioned such that there is a minimum distance of 6 inches between outer tip peripheries of the rake wheels.

* * * * *